(12) United States Patent
Yang et al.

(10) Patent No.: US 9,766,867 B2
(45) Date of Patent: Sep. 19, 2017

(54) SYSTEMS AND METHODS FOR IMPROVING PERFORMANCE OF MOBILE APPLICATIONS

(71) Applicant: THE TRUSTEES OF COLUMBIA UNIVERSITY IN THE CITY OF NEW YORK, New York, NY (US)

(72) Inventors: JunFeng Yang, New York, NY (US); Younghoon Jeon, Fort Lee, NJ (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 0 days.

(21) Appl. No.: 14/922,977

(22) Filed: Oct. 26, 2015

(65) Prior Publication Data

US 2016/0041816 A1 Feb. 11, 2016

Related U.S. Application Data

(63) Continuation of application No. PCT/US2014/035655, filed on Apr. 28, 2014.
(Continued)

(51) Int. Cl.
*G06F 9/45* (2006.01)
*G06F 9/445* (2006.01)
*G06F 9/455* (2006.01)

(52) U.S. Cl.
CPC ............ *G06F 8/447* (2013.01); *G06F 8/443* (2013.01); *G06F 8/52* (2013.01); *G06F 8/64* (2013.01); *G06F 9/4552* (2013.01)

(58) Field of Classification Search
CPC ... G06F 8/447; G06F 8/52; G06F 8/64; G06F 9/4552; G06F 8/443
(Continued)

(56) References Cited

U.S. PATENT DOCUMENTS 6,077,311 A 6/2000 Lichtenstein et al.
6,110,226 A * 8/2000 Bothner .................... G06F 8/44
717/153
(Continued)

FOREIGN PATENT DOCUMENTS

WO WO 2011/146750 A2 11/2011
WO WO 2013/016054 A1 1/2013

OTHER PUBLICATIONS

Cross-Platform Development Tools for Smartphone Applications—Julian Ohrt and Volker Turau, Hamburg University of Technology, Germany—Computer ( vol. 45, Issue: 9, Sep. 2012)—pp. 72-79; IEEE Computer Society.*
(Continued)

*Primary Examiner* — Francisco Aponte
(74) *Attorney, Agent, or Firm* — Baker Botts L.L.P.

(57) ABSTRACT

Systems and methods for improving the performance of mobile applications are disclosed. An exemplary method can include receiving a request for the application, where the request can include target device information. The method can also determine whether the application has been cached before. If the application has not been cached, the method can download the application as a bytecode and process the bytecode into the native code format, using an Ahead-of-time compiler. The method can also provide the application in the native code format to the target device over the network.

19 Claims, 8 Drawing Sheets

Related U.S. Application Data

(60) Provisional application No. 61/816,461, filed on Apr. 26, 2013, provisional application No. 61/871,075, filed on Aug. 28, 2013.

(58) Field of Classification Search
USPC .......................................... 717/148, 168–178
See application file for complete search history.

(56) References Cited

U.S. PATENT DOCUMENTS

| | | | |
|---|---|---|---|
| 6,219,787 B1 | 4/2001 | Brewer | |
| 6,247,174 B1* | 6/2001 | Santhanam | G06F 8/447 717/154 |
| 6,895,579 B2* | 5/2005 | Lueh | G06F 8/441 717/116 |
| 6,944,795 B2 | 9/2005 | Iline | |
| 7,174,544 B2* | 2/2007 | Zee | G06F 8/41 717/136 |
| 7,213,240 B2* | 5/2007 | Wong | G06F 8/443 717/148 |
| 7,313,789 B1 | 12/2007 | Yellin et al. | |
| 7,530,061 B2* | 5/2009 | Santhanam | G06F 8/41 717/116 |
| 7,587,712 B2* | 9/2009 | Mountain | H04W 8/245 709/203 |
| 7,752,055 B1 | 7/2010 | Partezana | |
| 7,996,826 B2* | 8/2011 | Park | G06F 9/45516 717/148 |
| 8,056,061 B2* | 11/2011 | Lee | G06F 8/41 712/E9.001 |
| 8,201,026 B1* | 6/2012 | Bornstein | G06F 9/45508 714/45 |
| 8,281,288 B1 | 10/2012 | Spencer | |
| 8,359,435 B2* | 1/2013 | Erez | G06F 21/52 711/118 |
| 8,359,496 B1* | 1/2013 | Bornstein | G06F 9/45508 714/45 |
| 8,423,976 B2* | 4/2013 | Zwirner | G06F 8/52 717/136 |
| 8,473,935 B2* | 6/2013 | Grice | G06F 8/4441 717/140 |
| 8,732,676 B1 | 5/2014 | Kolawa et al. | |
| 8,924,922 B2* | 12/2014 | Biswas | G06F 9/45516 717/104 |
| 9,152,437 B2* | 10/2015 | Spencer | G06F 9/445 |
| 9,164,783 B2* | 10/2015 | Stoodley | G06F 9/45516 |
| 9,392,051 B2* | 7/2016 | Cabillic | G06F 8/71 |
| 2002/0010911 A1* | 1/2002 | Cheng | G06F 8/443 717/128 |
| 2003/0076366 A1 | 4/2003 | Skjolsvold | |
| 2004/0230950 A1 | 11/2004 | Bedner et al. | |
| 2005/0033983 A1 | 2/2005 | Takekawa et al. | |
| 2006/0143601 A1* | 6/2006 | Concha | G06F 8/61 717/170 |
| 2006/0158354 A1* | 7/2006 | Aberg | G06F 8/447 341/50 |
| 2007/0240136 A1* | 10/2007 | Garyali | G06F 9/468 717/140 |
| 2008/0005473 A1* | 1/2008 | Chen | G06F 8/4442 711/118 |
| 2008/0127103 A1 | 5/2008 | Bak | |
| 2009/0132861 A1 | 5/2009 | Costa et al. | |
| 2010/0017461 A1 | 1/2010 | Kokkevis et al. | |
| 2010/0198799 A1 | 8/2010 | Krishnan et al. | |
| 2012/0174069 A1 | 7/2012 | Zavatone | |
| 2012/0272132 A1 | 10/2012 | Mondal et al. | |
| 2012/0272223 A1 | 10/2012 | Persson et al. | |
| 2013/0033508 A1 | 2/2013 | Labour et al. | |
| 2013/0113809 A1* | 5/2013 | Kong | G06F 8/443 345/505 |
| 2015/0058826 A1 | 2/2015 | Hu et al. | |

OTHER PUBLICATIONS

Bytecode-to-C Aead-of-Time Compilation for Android Dalvik Virtual Machine—Hyeong-Seok Oh, Ji Hwan Yeo and Soo-Mook Moon; Department of Electrical and Computer Engineering, Seoul NAtional University, Seul, Korea—Design, Automation & Test in Europe Conference & Exhibition (Date) Mar. 9-13, 2015, Publisher: IEEE.*
On Real-Time Performance of Ahead-of-Time Compiled Java-Anders Nilsson and Sven Gestegård Robertz, Department of Computer Science, Lund University, Lund Sweden—Proceedings of the Eighth IEEE International Symposium on Object-Oriented Real-Time Distributed Computing (ISORC'05)—May 18-20, 2005.*
U.S. Appl. No. 14/468,020, Feb. 12, 2016 Notice of Abandonment.
U.S. Appl. No. 14/468,020, Jul. 31, 2015 Non-Final Office Action.
Alshahwan et al., "Automated Web Application Testing Using Search Based Software Engineering", ASE 2011 Proceedings of the 26th IEEE/ACM International Conference on automated Software Engineering, pp. 3-12 (2011).
Amalfitano et al., "Using GUI ripping for automated testing of android applications", ASE 2012 Proceedings of the 27th IEEE/ACM International Conference on automated Software Engineering, pp. 258-261 (2012).
Dhanapal et al., "Wind Tunnel: A Tool for Network Impact Testing of Mobile Applications", 2012 Annual SRII global Conference (SRII), pp. 34-43 (Jul. 22-24, 2012).
Dobolyi et al., "Modeling Consumer-Perceived Web Application Fault Severities for Testing", ISSTA '10 Proceedings of the 19th International Symposium on Software Testing and Analysis, pp. 97-106 (2010).
International Search Report and Written Opinion for PCT/US2014/035655, dated Sep. 22, 2014.

* cited by examiner

FIG. 5B

```
interpreter()
  while
    if block of current instruction is jitted
      execute jitted block
    else
      pop one instruction at the current position
      swtich (instruction)
      case
      ....
      case new object
        if class not found
          load_class()
        ...

...
      case method invocation
        if the method internal native
          prepare to call internal native method
          call the method
        else if the method standard native
          prepare to call standard native method
          call the method
        else
          prepare to call bytecode method
          move control to the instruction pointer
      ....

load_class()
  find class
  [check if class translated]
  read class header
  ...
  for each method in the class
    if the method native
      set as native method
    [else if translated class]
      [set as native method or translated block]
    else
      set instruction pointer
  ...
```

SYSTEMS AND METHODS FOR IMPROVING PERFORMANCE OF MOBILE APPLICATIONS

CROSS-REFERENCE TO RELATED APPLICATIONS

This application is a continuation of International Patent Application No. PCT/US2014/035655, filed Apr. 28, 2014, and claims priority to U.S. Provisional Application Ser. No. 61/816,461, filed on Apr. 26, 2013; U.S. Provisional Application Ser. No. 61/871,075, filed on Aug. 28, 2013, to each of which priority is claimed and the contents of each which are incorporated herein in their entireties.

BACKGROUND

The disclosed subject matter related to techniques for improving the performance of mobile applications.

Certain mobile applications can be written in languages such as Java or .NET. Developers can write applications using languages such as Java or .NET, compile the application to a bytecode, and run the application on many platforms using a compatible Virtual Machine (VM). Languages such as Java or .NET permit developers to avoid certain low-level issues such as memory management. Furthermore, languages such as Java or NET can also provide portability and security features that, for example, enable browsers to run untrusted applets.

However, languages such as Java or .NET can also require a higher overhead than that is required by a native code. For example, bytecode interpretation can involve more than 10× reduction in speed compared to native execution. While existing technologies such as Just-in-time compilation (JIT) can improve performance by compiling bytecode to a native code format, JIT can take time to perform and reduce application response time. Furthermore, due to CPU and battery constraints in mobile environments and the need to respond to users quickly, certain existing technologies such as JIT can have reduced functionality, such as global optimizations. Furthermore, Ahead-of-time compilation (AOT) can be used instead of JIT. Due to lack of run-time information, the code produced by AOT can require more file system space than the original bytecode. As such, there exists a need for an improving the performance of mobile applications

SUMMARY

Systems and methods for improving the performance of mobile applications are disclosed herein.

In one aspect of the disclosed subject matter, techniques for providing an application to a target device over a network in a native code format used by the target device are disclosed. An exemplary method can include receiving a request for the application, including target device information. The method can also determine whether the application has been cached before, and if not, downloading the application as bytecode and processing the bytecode into the native code format, using an Ahead-of-time compiler. The method can also provide the application in the native code format to the target device over the network.

In some embodiments, the method can further include receiving a request, including target device information such as a device type, an operating system version, and platform version. In some embodiments, the method can further include caching the application in the native code format if the application has not been cached.

The disclosed subject matter also provides apparatus for providing an application to a target device over a network in a native code format used by a target device. An exemplary apparatus can include a processor and a memory. The apparatus can further include computer program instructions stored in the memory that when executed by the processor causes the processor to perform certain operations. These can include receiving a request for the application, where the request can include a target device information. The instructions can further include determining whether the application has been cached, and if the application has not been cached, downloading the application as bytecode and processing the bytecode into a native code format, using an Ahead-of-time compiler. The instructions can also include providing the application in the native code format to the target device over the network.

In some embodiments, the processing is performed by an application developer server. In some embodiments, the processing is performed by an application broker server. In other embodiments, the processing is performed by the target device. In some embodiments, the target device can execute at least one of the bytecode and a native code.

BRIEF DESCRIPTION OF THE DRAWINGS

FIG. 5A and FIG. 5B illustrate an exemplary interpreter in accordance with the disclosed subject matter.

DESCRIPTION

Techniques for improving the performance of mobile applications are presented. An exemplary technique includes receiving a request for the application, where the request can include a target device information. The method can also determine whether, for example, the application in the native code format has been cached before, and if the application has not been cached, can download the application as a bytecode or require the target devices to upload bytecode. The method also provides for processing the bytecode into the native code format, using an Ahead-of-time compiler. The method can also provide the application in the native code format to the target device over the network.

Figure 1:
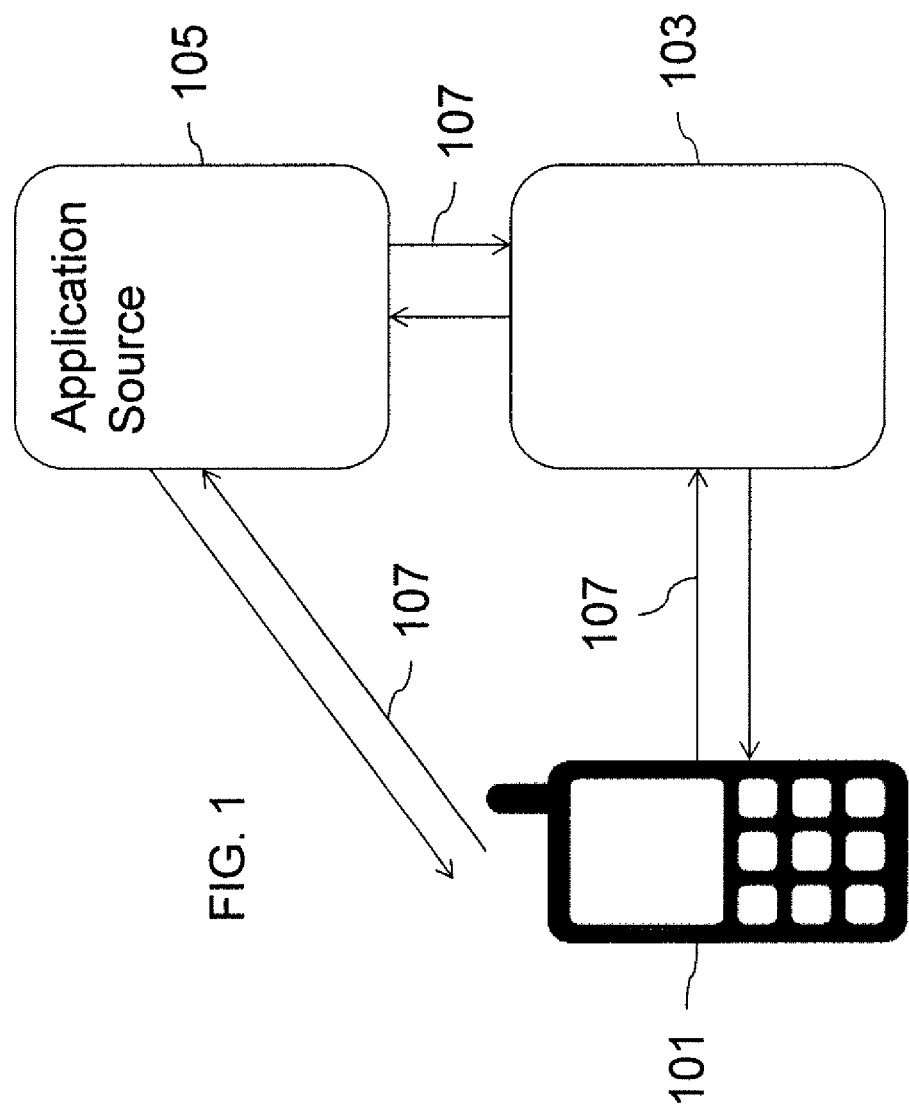
FIG. 1 illustrates an exemplary system in accordance with the disclosed subject matter.

FIG. 1 illustrates an exemplary system in accordance with the disclosed subject matter. With reference to FIG. 1, when a user 101 wants to download an application, her device 101 can send a request to the application accelerator 103. It should be understood that the device 101 can be a target device 101. The request can be sent over a network 107. The request can include information such as the device type and the system version.

The application accelerator 103 can determine whether this is the first time the application is requested for the given environment. If it is the first time, the application accelerator 103 can download the application from the application source 105. It can be understood that the application source 105 can be an application broker 105. The downloaded application can be a bytecode version. In one embodiment, pre-processed bytecode, for example, platform dependent bytecode, can be received from the application broker 105 or application source 105. The application accelerator 103 can then compile the application to a native code format that can be executed in the user's device 101. In one embodiment, the application accelerator 103 can process a portion of the bytecode of the application into the native code format. In another embodiment, the application accelerator 103 can perform techniques such as profiling to determine portions of the application to convert to native code. In one example, select parts of the application can be selected and the bytecode for the select parts of the application can be converted into native code. In one embodiment, the application accelerator 103 can receive for example, generic bytecode or a pre-processed bytecode. The native code can include an optimized code. The application accelerator 103 can then cache the native version of the application. This can enable the application accelerator 103 to amortize the compilation cost and respond faster to later requests from the same device type and operating system version. It should be understood that the application accelerator 103 can reside in the device 101 or outside the device 101.

In an exemplary software distribution model, developers can ship their software in removable media or through online websites. In this model, bytecode can provide excellent portability for software intended to run on many different platforms because it is difficult for the developers to track the diverse user devices and for the non-expert users to select the right software versions. However, in current application distribution models, application sources 105 or application brokers, can determine information concerning the application, for example, the device 101 and the system version from which a user is downloading an application. For instance, the protocol to download applications from Android's application store (Google Play) specifies device type 101 and Android SDK version, which Google Play uses to filter applications incompatible with the device In one embodiment, given device and system configuration, application sources 105 can then AOT-compile and optimize a bytecode application down to native code for a specific device type, while being transparent to both developers and users. In one example, the portability of bytecode can disappear with broker-managed or application-source managed portability. Furthermore, certain mobile platforms can enforce security at the systems level. For instance, Android can assign each installed application a different User Identifier (UID), isolating the application's data and execution. This can make the security offered by bytecode less attractive. Moreover, since users already trust application sources 105 not to add malice to applications, they can let the application sources 105 verify bytecode on their behalf before shipping the AOT-compiled native code.

In one embodiment, the target device 101 can load and execute, for example, both (1) the bytecode format, for example the generic bytecode format, that is downloaded from the application source 105 and (2) the native code format downloaded from the application accelerator 103. This can enable the target device 101 to selectively translate bytecode applications into a native code format. In another example embodiment, users can manually choose which applications to optimize. In one example, a user application can display on the device 101 the applications that are optimized and can allow the user to select other applications to optimize. In another example embodiment, a program can be provided to determine which applications can be optimized automatically. The decision can be made on various criteria. For example, the criteria can include, but is not limited to, frequency of application use. The criteria can also include efficiency of AOT.

In one embodiment, the bytecode downloaded from application source 105 can be pre-processed into platform dependent bytecode before the AOT compilation. Pre-processing bytecode can include, but is not limited to, pre-linkage, pre-verification, and pre-optimization, or the like. Using pre-processed bytecode as an input of AOT compilation can enable the compiler to produce, for example, an efficient native code as JIT compilers by allowing to use device specific run-time information such as linkage information. In one embodiment, platform information of the target device 101 can be used to determine how to pre-process the bytecode. The platform information can include, but is not limited to, information such as OS version and version of framework, and version of pre-installed applications, or the like. In one example, the application accelerator 103 can use the platform information to produce pre-precessed bytecode for the target device 101 before compilation. If the application accelerator 103 does not have enough information to pre-process the bytecode for the target device 101, the application accelerator 103 can require the target device 101 to upload pre-processed bytecode on the target device 101 to the application accelerator 103.

In some embodiments, one of the machines in the application distribution path such as a development machine or an application broker server 105 can perform the processing. In some embodiment, the machines out of the distribution path can perform the processing. In some embodiment, the processing can be performed on the target device 101.

For purposes of this disclosure, the application accelerator 103 can include random access memory (RAM), storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory. The application accelerator 103 can further include a processor, which can include processing logic configured to carry out the functions, techniques, and processing tasks associated with the disclosed subject matter. Additional components of the application accelerator 103 can include one or more disk drives. The application accelerator 103 can include one or more network ports for communication with external devices. The application accelerator 103 can also include a keyboard, mouse, other input devices, or the like. An application accelerator 103 can also include a video display, a cell phone, other output devices, or the like. The network 107 can include communications media such wires, optical fibers, microwaves, radio waves, and other electromagnetic and/or optical carriers; and/or any combination of the foregoing.

Figure 2:
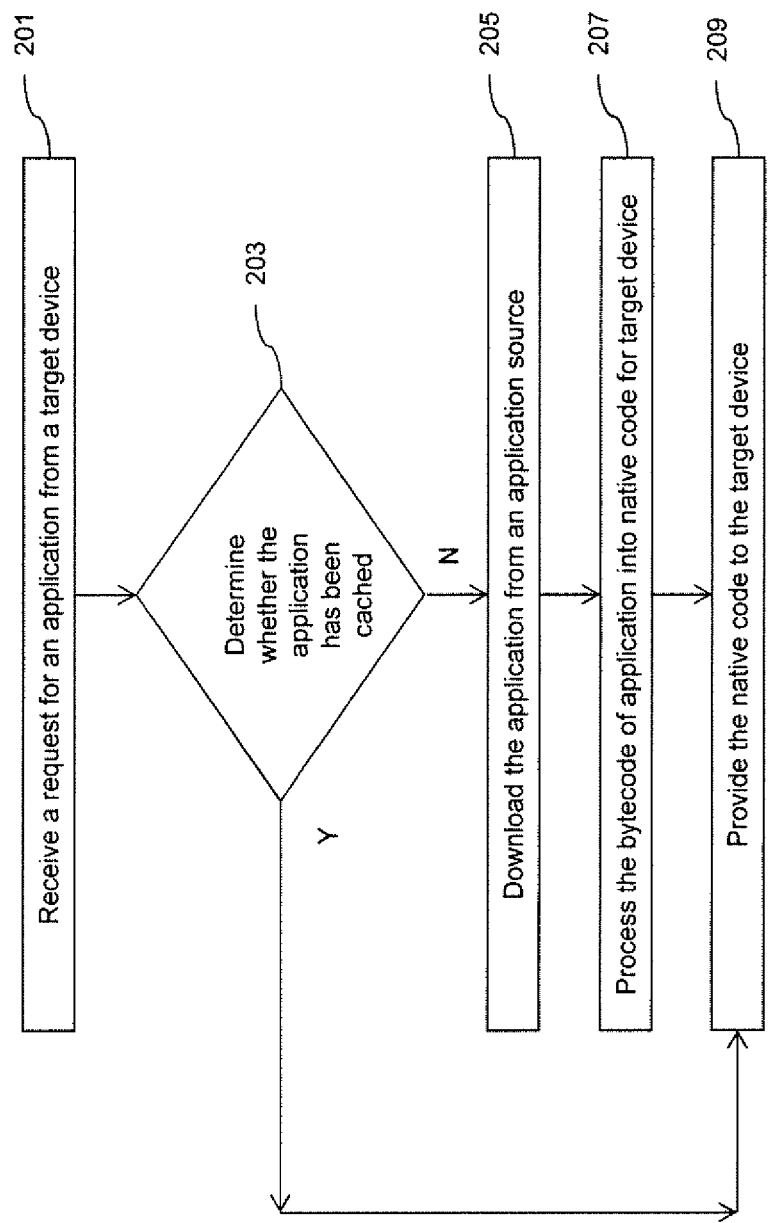
FIG. 2 illustrates an exemplary method for providing an application to a target device over a network in a native code format in accordance with the disclosed subject matter.

FIG. 2 illustrates an exemplary method for providing an improved application from an application source 105 to a target device 101 over a network 107 in a native code format used by a target device 101 in accordance with the disclosed subject matter. With reference to FIG. 2, in one embodiment, the application accelerator 103 can receive a request for the application from the target device 101 (201). The request can include, for example, the target device 101 information and the operating system of the target device 101. In one example, the application accelerator 103 can then determine whether the application has been cached before (203). This can include determining whether the application has been downloaded or obtained before or whether the application has been converted into a native code format for the type of the target device 101.

In one example, if the application has not been cached, the application is then downloaded or obtained from an application source 105 (205). It should be understood that an application source 105 can be an application broker. When the application is obtained, the application accelerator 103 can then process the application, which can be in bytecode, into a native code format for the target device 101 (207). In one example, the whole application is converted into a native code format. In another example, some portions of the application is converted into a native code format. In one example, the application accelerator 103 can then provide the application in the native code format to the target device 101 (209).

Figure 3:
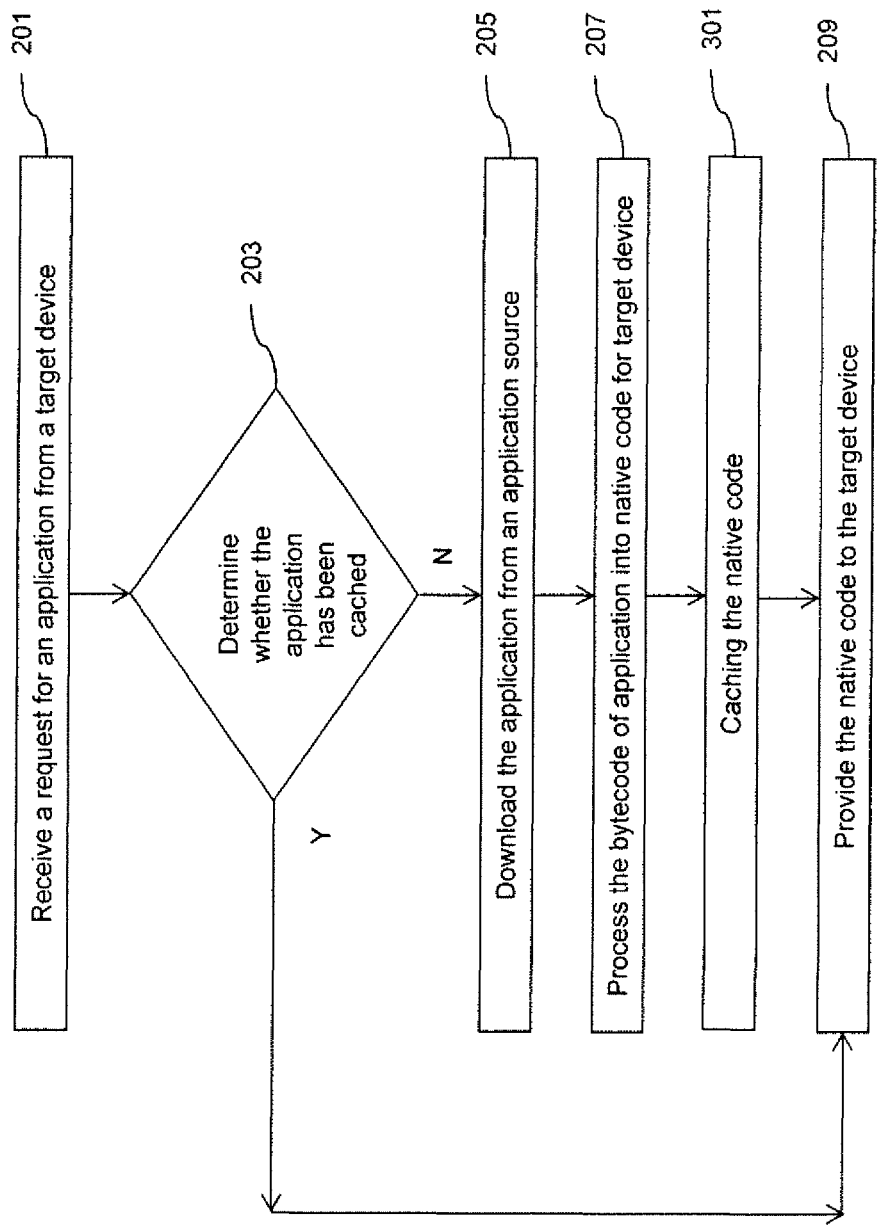
FIG. 3 illustrates an alternative exemplary method for providing application to a target device over a network in a native code format in accordance with the disclosed subject matter.

FIG. 3 illustrates an exemplary method for providing an improved application from an application source 105 to a target device 101 over a network 107 in a native code format used by a target device 101 in accordance with the disclosed subject matter. With reference to FIG. 3, in one embodiment, the application accelerator 103 can receive a request for the application from the target device 101 (201). In one example, the application accelerator 103 can then determine whether the application has been cached before (203). This can include determining whether the application has been downloaded or obtained before or whether the application has been converted into a native code format for the type of the target device 101. In one example, if the application has not been cached, the application is then downloaded or obtained from an application source 105 (205). When the application is obtained, the application accelerator 103 can process the application, which can be in bytecode, into a native code format for the target device 101 (207). In one example, the application accelerator can cache the application, for example in the native code format (301). The application accelerator 103 can then provide the application in the native code format to the target device 101 (209).

Figure 4:
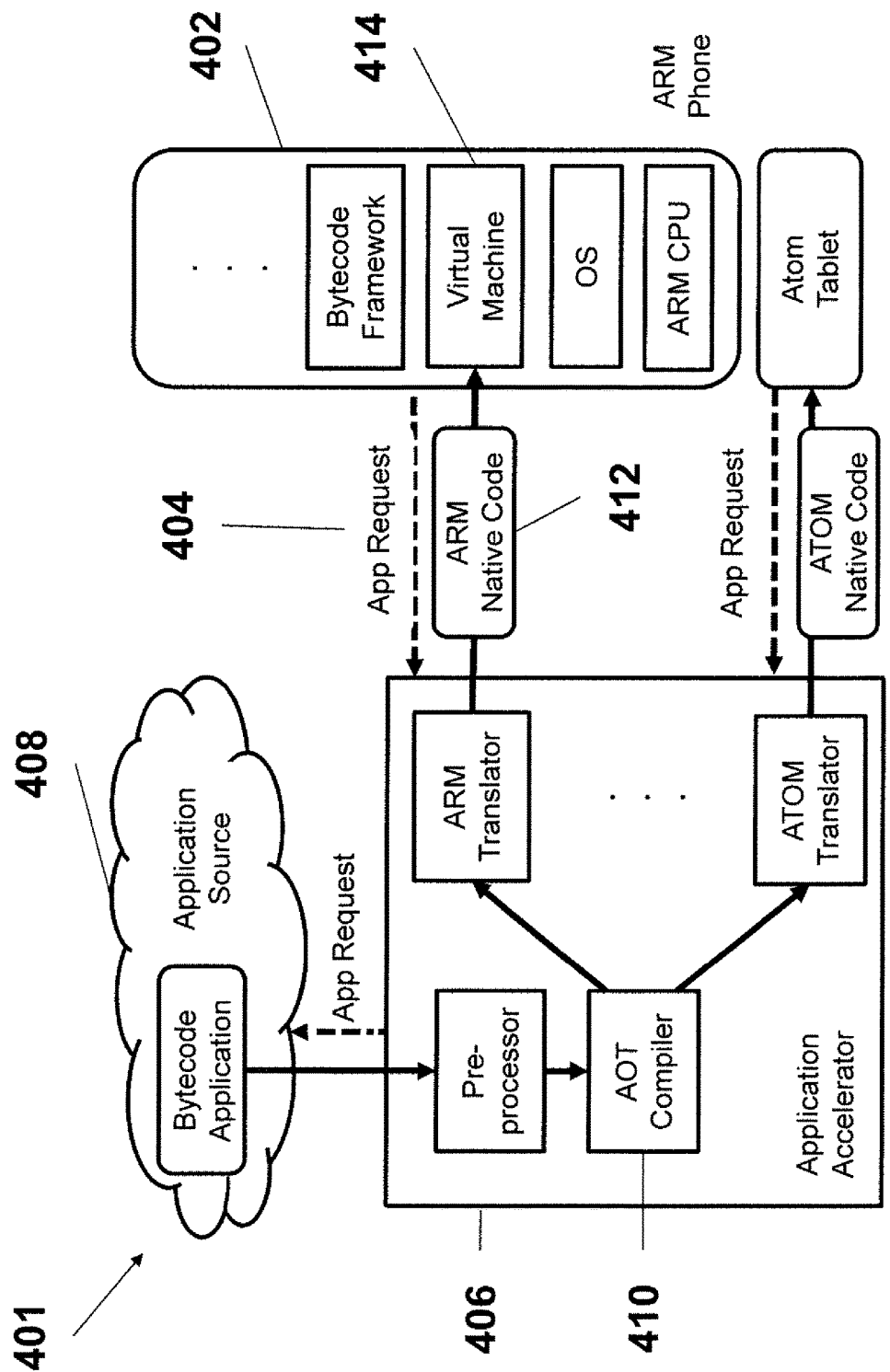
FIG. 4 illustrates an exemplary system architecture in accordance with the disclosed subject matter.

FIG. 4 illustrates an exemplary system architecture in accordance with the disclosed subject matter. The architecture can include an application accelerator 103, 406, which can be understood as a proxy. The system architecture can also include an application source 105 or an application broker 408, from where the application can be obtained. The system architecture can also include a user's device or a target device 101 such as a phone 402 or a tablet, or the like. The target device 101, 402 can include a bytecode framework, modified Dalvik Virtual Machine (VM), an Operating System (OS), and a processor such as an ARM processor.

When the target device 101, 402 wants to download an application, the target device 101, 402 can send a request 404 to the application accelerator 103, 406 over a network 107. The request can include information such as the device type and the system version. If this is the first time the application is requested for the given environment, the application accelerator 103, 406 can download the application from the application source 408. The application can be downloaded in a bytecode version. In one example, if the application accelerator 103, 406 has not downloaded the application for the given environment, the application accelerator 103, 406 can download the bytecode version of the application from the application source 105, 408. The application accelerator 103, 406 can then compile the application, using an Ahead-of-time (AOT) compiler 410 to a native code format that is, for example, optimized for execution in the target device's 101, 402 environment. The application accelerator 103, 406 can then cache the native version of the application. This can, for example, amortize the compilation cost and respond faster to later requests from the same device type and OS version.

With further reference to FIG. 4, in one embodiment, the application accelerator 103, 406 and the AOT-compiler 410 can be placed at different positions in the application distribution path. For example, the application accelerator 103, 406 and the AOT-compiler 410 can be placed at the application developer workstations, application source 105 servers, user desktops, the target device 101, or at the application source 105, 408 site. This position can provide transparency and efficiency. AOT-compilation that is performed by the AOT-compiler 410 can incur redundant work because each device of the same type and the same system version can still need to perform the sample compilation work on an application. It can also require compilation infrastructure support on the devices. AOT-compilation at user desktops or developer workstations can require users or developers to set up the infrastructure.

With further reference to FIG. 4, in one embodiment, the application accelerator 103 can be located at positions out of the application distribution path. For example, the application accelerator 103 can be located at a server independent from the distribution path. In one example, the server can require the target device 101 to upload for example, the application bytecode or pre-processed application bytecode, or the like. In another embodiment, the application accelerator 103 can be located at the target device 101. In this embodiment, the application accelerator 103 can, for example, can optimize applications selectively on the target device 101.

EXAMPLES

Incrementally Deployable Ahead-of-Time Compiler

For purpose of illustration and not limitation, exemplary embodiments of the disclosed subject matter will now be described. While the disclosed techniques can be versatile, description will now be made for purposes of illustration in connection with the disclosed subject matter. An AOT compiler 410 can be implemented such that the native code generated by the AOT compiler 410 and the bytecode in the system can seamlessly interoperate. Furthermore, the AOT compiler 410 can be implemented such that the overhead for calling in both directions can be reduced. Additionally or alternatively, the overall performance of the combined native code and bytecode system can be improved compared to bytecode alone, and can generally improve as more bytecode is converted to native code.

In an exemplary illustration, the application accelerator 103 can generate native code by leveraging JNI at least in part because JNI can be designed to allow bytecode and native code to interoperate. However, the overhead of cross-JNI calls can be relatively high, as shown for example in Table 1. For example, a JNI method can be passed a Java object and can thus be directed to access a field, method, or type of the object. However, the JNI method can be unable to directly perform such access at least in part because it can be without the actual references to the field, method, or type for portability reasons. Instead, the JNI method can have only integer indexes to the data and can utilize a call into the JNI environment to resolve the indexes into actually references and perform method calls, which can include frequent "context switches". As shown in Table 1, simple field or method access can have a 4× to 20× slowdown. As embodied herein, calls including cross native and bytecode boundaries can be frequent.

TABLE 1

Example Android JNI overhead.

| Operation | Java | JNI |
|---|---|---|
| Non-static field access | 11.8 ms | 127.2 ms |
| Static field access | 6.2 ms | 108.6 ms |
| Non-static method call | 2.0 ms | 42.8 ms |
| Static method call | 31.1 ms | 124.5 ms |

Additionally or alternatively, and as embodied herein, the AOT compiler 410 can target the internal native method interface of Dalvik VM directly. The native code generated can be invoked by Dalvik VM as if the code were part of Dalvik VM, which can avoid the unnecessary portability overhead of JNI. The generated native code can assume the same data structures for representing classes, methods, and fields as Dalvik VM, and can invoke Dalvik VM's functions for resolving them. AOT compiler 410 can also call bytecode methods by invoking Dalvik's interpreter/JIT engine on the bytecode methods.

The incrementally deployable design can also allow the application accelerator 103 to perform more aggressive optimization techniques. Java class loading can change the class hierarchy and the implementation of methods, as discussed further herein. The application accelerator 103 can address this challenge by dynamically monitoring class loading and performing certain aggressive optimizations only at advantageous times. That is, the application accelerator 103 can detect class loading at runtime and can discard the translated code by invoking Dalvik's interpreter/JIT engine on the bytecode methods. In practice, neither the applications evaluated nor the Android framework typically utilize class loading, and thus the application accelerator 103 can run all the evaluated applications with techniques such as full optimization.

According to another aspect of the disclosed subject matter, the application accelerator 103 can perform a number of techniques to further improve application such as, but not limited to, improving the application speed. The application accelerator 103 can perform compilation ahead of run time, and thus can perform global techniques such as, but not limited to, global optimizations that can often scan the entire program.

In an exemplary embodiment of the disclosed subject matter, the AOT compiler 410 can utilize techniques such as optimization techniques. These exemplary techniques can include, but are not limited to register reallocation, method inlining, constant propagation, eliminating unreachable code eliminating redundant load-store, removing unnecessary null-reference check, and removing unnecessary array bound check, or the like.

In certain implementations, java class loading can invalidate the global analysis utilized herein at least because class loading can change method implementations and class hierarchies. To limit or prevent errors due to class loading, as discussed herein, the application accelerator 103 can monitor class loading and can invoke Dalvik's interpreter/JIT engine on the bytecode methods if the program loads a class at runtime.

For purpose of illustration of the disclosed subject matter, and not limitation, the application accelerator 103 can be implemented for Android. However, it will be recognized that the systems and techniques described herein can be utilized in any suitable platform.

In one embodiment, the application accelerator 103 can be implemented in part by performing certain modifications to Dalvik VM. Such modifications can include glue code that can provide a set of support functions to be called by AOT-compiled native code and patch code to Dalvik itself.

For example, the glue code can export functions that are called by the native code generated by AOT compiler 410. These functions can include, for example and without limitation, functions that do type conversion, functions that resolve fields, methods, and classes, such as the resolveField, getObjectField, and resolveMethod functions, functions that allocate objects and arrays, and functions that look up constants from constant pools, and any other suitable functions.

For purpose of illustration, the patch code can perform the following modifications. The patch code can change the application loader to read AOT-compiled native code and set, for example, a certain member field of the method metadata to the native addresses of the methods in the AOT-compiled native code.

For purpose of illustration and not limitation, modifications to Dalvik VM can be performed using Ice-cream Sandwich (Android 4.0.4 r2). A patch can be generated and applied to the latest version of Jelly Bean (Android 4.2.2 r1).

In an exemplary embodiment, the AOT compiler can utilize ODEX files as an input instead of DEX files. It should be understood that ODEX files can also be understood as .odex files. It should also be understood that DEX files can also be understood as .dex files. ODEX can be a preprocessed, platform dependent bytecode format of DEX. Producing ODEX files can include, but is not limited to, processes of verification, optimization, and linkage, or the like. Using ODEX can allow for performance improvement, by providing the AOT compiler run-time information such as linkage information.

Furthermore, and as embodied herein, with a .dex file of Dalvik, AOT compiler 410 can call Android's dex-opt utility to optimize the file into an .odex file, as discussed herein. This utility can resolve some of the method calls and can replace the corresponding invoke-*instructions (which can require resolving a method given a class name and method name) with faster invoke-*-quick instructions (which can look up the method in the virtual table with an index directly). The library can parse the segments, but does not necessarily build an intermediate representation (IR). As such, an intermediate representation of Dalvik instructions can be created for analysis and methods can be built to parse the IR. Such a parser can support all Dalvik instructions. AOT compiler 410 can perform the techniques such as, but not limited to, optimizations described herein, and for purpose of illustration and as embodied herein, can output compiled code in any suitable form. A .dex or .odex file can include many Java class files to save space (for example, about 2.3 times). To speed up compilation, AOT compiler 410 can precompile and optimize the classes in parallel down to native code.

Furthermore, and as embodied here, a Java implementation of the Google Play protocol can be utilized for searching and downloading applications. The implementation can be configured to AOT-compile applications and cache compiled applications, for example by configuring an application to download applications from the proxy.

According to another aspect of the disclosed subject matter, an interpreter for executing optimized applications incrementally is provided. In an exemplary embodiment of an interpreter, the interpreter can utilize internal native interface mechanisms. As embodied herein, an standard internal native interface can include standard internal native functions or routines that can be invoked from inside of the interpreter and have direct access to the interpreter, for example and without limitation, native methods (a set of native functions provided to access and manipulate interpreter status, such as get current free memory of the interpreter, hooking methods and field in run-time, control interpreter-level thread) and code blocks (such as (1) JIT-compiled code blocks in the JIT table or (2) code blocks of custom defined formats that can be invoked from the inside of the interpreter). In some embodiments, standard internal native functions can include, for example and without limitation, functions implemented using the Java Native Interface (JNI).

Functions or routines executed via internal native interface can be part of the interpreter, written by developer of interpreter, and can generally not be allowed to be written by $3^{rd}$-party developers. As such, employing the internal native interface model can require slight modification of the original interpreter so that the interpreter can load and execute functions and code blocks from outside of the interpreter. Each method of original bytecode can be translated to a single native method and one or more machine code blocks. The native method and machine code blocks can be merged into a library. In this manner, the library can be loaded by the interpreter when the original application is loaded or when each method of the application is first executed, and the native method and/or code block can be set to a suitable position, for example native method table manage by the interpreter for native method, JIT table for JIT code block, special purpose table for special code block). and the native method and/or code block can executed by the interpreter.

Figure 5A:
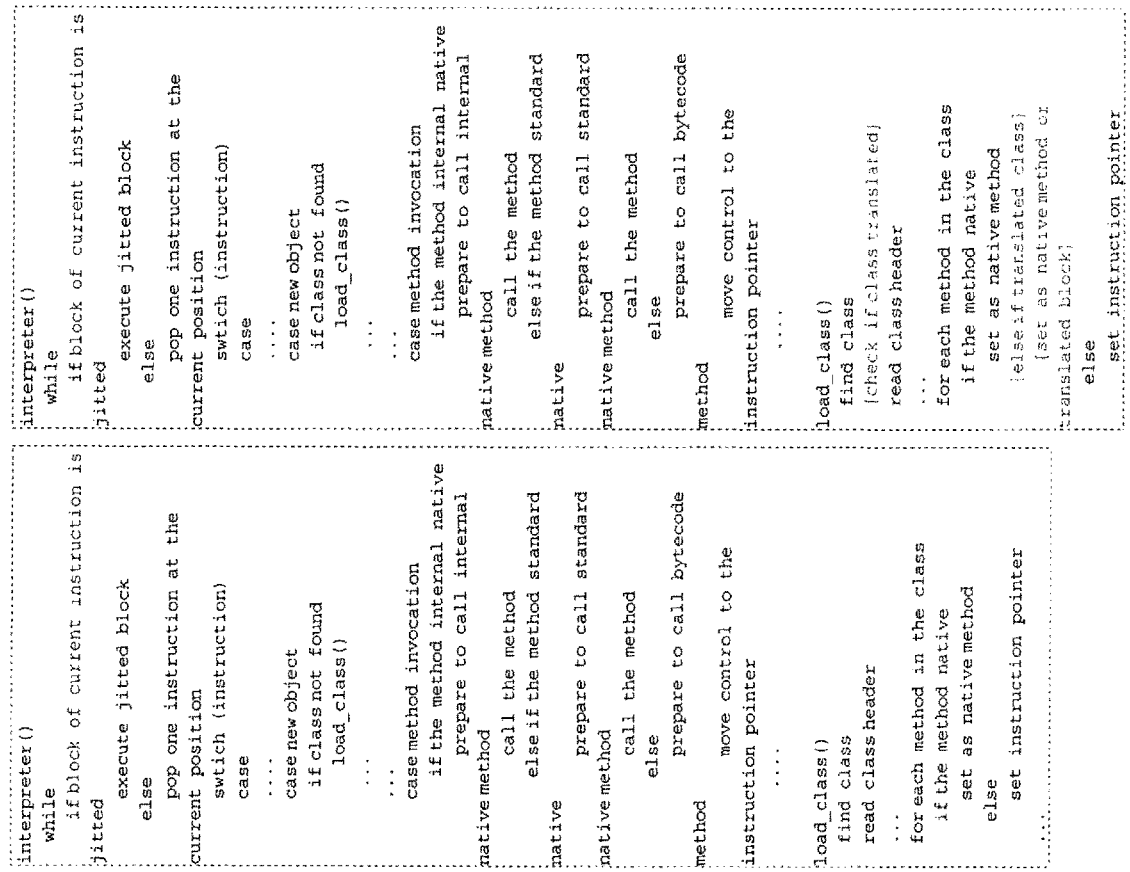

FIG. 5A and FIG. 5B illustrate an exemplary interpreter implementation in accordance with the disclosed subject matter. An exemplary technique for implementing the interpreter is illustrated in FIG. 5A and FIG. 5B. In an alternative embodiment of an interpreter according the disclosed subject matter, a standard native interface can be used instead of the internal native interface. Such an embodiment can be utilized, for example, when the original interpreter cannot practically be modified. The standard native interface can allow 3rd party developers to write native modules, provided by interpreter (e.g. JNI in Java). In this embodiment, each method of the original application can be translated to a standard native method and can be compiled to a native module with the tool-chain included in development kit supported by the interpreter. This native module can be loaded and executed by the interpreter as discussed herein. The module does not require modification of the interpreter. However, such a technique can have reduced speed, at least in part because for some interpreters, the standard native interface can consume increased performance overhead compared to internal native interface.

Alternatively, an interpreter clone can be used to solve the performance overhead of standard native interface, by minimizing the number of invocation of standard native interface, for example if source code of the interpreter is available. In this exemplary technique, minimal number of method invocation can be translated to invocation via standard native interface. These method invocations can include method which should be invoked from the interpreter without modification of the interpreter. (e.g. callback, native) Remaining methods are translated into other format, depending on the technique used. Another interpreter implementation which can run outside of the original interpreter can execute expensive operations (such as method invocation or the like) without using standard native interface. This external interpreter can be implemented using the original interpreter or its own interpreter.

Alternatively, an interpreter can be implemented that is compatible to the original bytecode. In this exemplary interpreter, translated machine code need not be in the format that the interpreter provides.

Alternatively, a soft-code copy of an existing interpreter can be utilized to reduce the performance overhead of standard native interface, for example by reducing the number of invocations of standard native interface, using techniques described herein.

Figure 6:
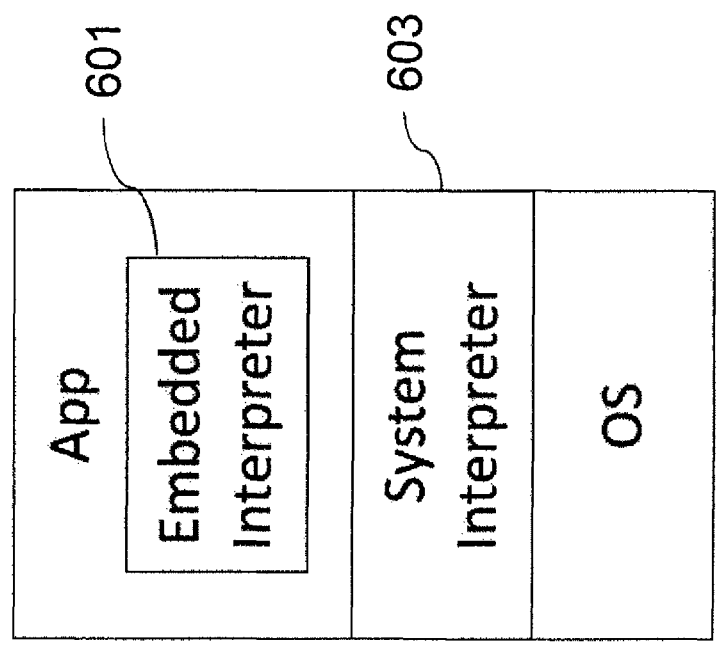
FIG. 6 illustrates further details of an exemplary s interpreter in accordance with the disclosed subject matter.

Alternatively, an interpreter embedded in an application can be utilized to minimize the performance overhead of standard native interface, using techniques described herein. FIG. 6 illustrates an exemplary system interpreter in accordance with the disclosed subject matter. As illustrated for example in FIG. 6, a whole or simplified version of the underlying system interpreter 603 or a different interpreter can be compiled into a binary module and embedded into the optimized application. In the phase that uses techniques such as, but not limited to, optimization, certain method invocations can be translated to invocation via the standard native interface. These certain methods can include, for example event handlers or methods in frameworks. Remaining methods invocations can be translated to invocation via internal native interface of the embedded interpreter 601. Once the control of the underlying interpreter moves to the embedded interpreter 601, all instructions to be handled by the underlying interpreter can be handled by the embedded interpreter 601, at least until the embedded interpreter 601 finds a method invocation to be handled via standard native interface.

Additionally or alternatively, a new interpreter can be implemented that is compatible to original bytecode. In this manner, translated machine code does not necessarily need to be in the format that the interpreter provides.

According to another aspect of the disclosed subject matter, a translator to translate bytecode to machine code is provided. In an exemplary embodiment, a translator can include a decoder, an analyzer, and a compiler. Each component can be included in a single program or each can be implemented as an external individual program and communicate with the other components via inter-process communication (IPC), files or any other suitable technique.

Figure 7:
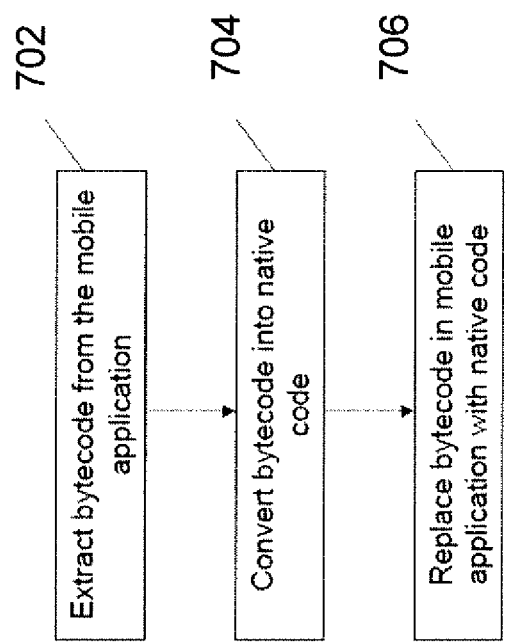
FIG. 7 illustrates an exemplary translator in accordance with the disclosed subject matter.

FIG. 7 illustrates an exemplary translator implementation in accordance with the disclosed subject matter. With reference to FIG. 7, for purpose of illustration, at 702, the decoder can extract bytecode from the application package. Furthermore, and as embodied herein, the decoder can decode the bytecode and read each method from the bytecode, and the bytecode can be translated into an intermediate representation (IR), which can be suitable for analyzing and optimizing.

Furthermore, and as embodied herein, the analyzer can receive the IR from the decoder and using the IR can analyze the whole bytecode and each method therein. Additionally, the analyzer can transform IR by hardening bytecode of original applications. Furthermore, the analyzer can perform one or more techniques such as, but not limited to, optimizations on the IR, including both global and local optimization, for example and without limitation, register promotion, method inlining, null reference removal, array bound check removal, or any other suitable technique.

Additionally, and as embodied herein, the compiler can receive the optimized IR from the analyzer and translate the optimized IR into native machine code. The implementation of the compiler can vary by target device 101 and can depend, at least in part, on the implementation of the interpreter, as discussed herein.

For purpose of illustration, and as embodied herein, at 702, the compiler can translate the IR into machine code as follows. Basic bytecode instructions, such as assignment, primary type-casting, flow control, conditional, comparison, arithmetic, logic, bit-wise, can be directly translated to appropriate machine code. Interpreter specific instructions can be translated to a set of machine code that can invoke routines provided by the interpreter or using standard native interface. Such instructions can include object manipulation, access static/dynamic field, method invocation, exception handling, built-in array operation, built-in string operation, and synchronization. During a technique such as an optimization, certain complex interpreter-specific instructions can be simplified and optimized so that they can be directly translated to appropriate machine code. At 704, the compiler can merge translated native methods or code blocks into a single executable which can be loaded by the interpreter. The executable file can be re-packaged with the original application package, or can be sent to devices 101 separately. During execution of the translated applications, the interpreter can determine whether there is translated executable for the application, from the package of the application or appointed directory, and can load the executable if it is found. As such, the interpreter can replace reference to each method by the corresponding translated method so that the interpreter can invoke the translated methods instead of the original methods.

Furthermore, translated binary can be loaded into the memory of the interpreter process when the whole program is loaded, when each module (e.g., a class in java) is loaded or when each method is loaded. The timing can depend on the particular application and can take into account the desired performance and efficiency. In this manner, the modified interpreter can search an appointed place (e.g., a directory) to find translated binary, and opens it. The modified interpreter can read the binary library into the process memory and set references of each method into appropriate location, which can depending on the implementation of the interpreter, as discussed herein, so the interpreter can execute translated code instead of original bytecode method as if they were native methods or already translated by the JIT compiler.

Translation can occur, for example, before the application is released (e.g., by the developer), before the application is downloaded to the device 101 (e.g., by an application source or proxy), or after the application is downloaded to the device 101 (e.g., by the user's device).

Translation can be performed before the application is released, with supported tools. For purpose of illustration, and as embodied herein, the developer can translate the bytecode application before they deliver applications to users or a broker server. In this manner, the developer can specify the list of target devices 101. A translation tool can be installed to the developer's machine, or can be provided as a network-based service. The translation tool or service can receive the application package and target device 101 as input. As embodied herein, the developer can submit the application package and selected target device, receive the translated package, and deliver the translated package to users or a broker server.

Alternatively, translation can be performed before being sent to a user's device 101, for example, when applications are received by a application source 105 server or proxy or when the application source 105 server or proxy receives a download request from a user 101 (i.e., on-demand compilation). In this manner, configuration information can be used to generate machine code for a particular target device 101, or the application source 105 server or proxy can request the necessary information from the target devices 101.

For example, the translator can be merged with an application source 105. As embodied herein, the application source 105 can receive application requests from devices 101, which can include device configuration information (e.g., an id) and can select the suitable version of the application for the device, and send it to the device. In this manner, the merged translator can translate the application with given device 101 information. The application source 105 can send translated application to the device instead of the original application. Alternatively, when modifying the application source 105 service is not practical, a translation proxy service can be installed between the application source 105 service and the user devices 101.

An exemplary translation procedure is now described. In one embodiment, the decoder can extract bytecode from the target application package, and open it. The decoder can then read each method from the bytecode, decodes, and transforms it to IR. An analyzer can then analyze the whole bytecode and each method. The analyzer can then decide which module or class should be optimized. In one example, the optimizer optimizes IR using the report from the analyzer. In another example, the process that uses techniques such as an optimization, can include global optimization such as the whole program or class and local optimization such as method or block.

In one example, register promotion, method inlining, removal of null reference check, removal of array bound check can be used. The compiler can translate optimized IR of each method, depending on the model to one of a internal native function of the interpreter, a standard native function, code blocks, or the like. Instructions of each method can be translated to machine code of the target device 101 using the following exemplary technique. In one exemplary technique, the basic bytecode instructions can be directly translated to appropriate machine code. Some examples include, but are not limited to assignment, primary type-casting, flow control, conditional, comparison, arithmetic, logic, bit-wise, or the like.

The interpreter specific instructions can be translated to a set of machine code which can invoke routines which are provided by the interpreter or using standard native interface. Some examples include, but are not limited to object manipulation, access static/dynamic field, method invocation, exception handling, built-in array operation, built-in string operation, synchronization or the like. In the process that uses techniques such as, but not limited to, optimization, some of expensive interpreter specific instructions can be simplified and optimized so that they can be directly translated to appropriate machine code. In one example, the compiler can merge translated native methods or code blocks into a single executable which can be loaded by the interpreter.

In another example, the executable file can be re-packaged with the original application package, or can be sent to devices separately. In one example, when the translated applications are to run, the interpreter can try to find if there is translated executable for the application, from the package of the application or appointed directory, and loads the executable if it is found. In one example, the translated applications are to run, the interpreter tries to find if there is translated executable for the application, from the package of the application or appointed directory, and loads the executable if it is found. In another example, the interpreter can replace reference of each method by translated method so that the interpreter invokes translated methods instead of the original methods As a further alternative, applications can be translated after they are downloaded to user's device 101. For purpose of illustration and not limitation, translation can be performed automatically, for example as a background service running on the device 101, and can optimize installed applications when they are installed or periodically. Additionally or alternatively, translation can be performed manually. For example with a supported system application, a user can select which application is optimized. As embodied herein, a translator tool-chain can be provided and installed to the user's device 101. This translator can run as a background service of local machine, or can be launched by the user's action. A client installed in the device 101 can communicate with the translator process, can send bytecode of installed applications, perform the translation, and download the translated application back to the device. Device 101 information can be sent to the translator along with the bytecode to assist the translator in determining any compilation options.

While translation can generally be performed by the user's device 101, if the user's device 101 is unsuitable for translation, for example if the user's device 101 does not have computing power strong enough for the translation, a cloud service or other tools can be provided to perform the translation.

For example, and as embodied herein, a cloud or remote (Internet) service can perform the translation process. A client installed in the user's device 101 can retain the address of the remote service, and the translation procedure can be performed on the remote server. Detailed device information can be sent to the service, or can be manage by the service (e.g., using a device ID registered with the service)

Analysis

The application accelerator 103 was evaluated on 10 applications, including 8 real-world applications and 2 benchmark suites. The real-world applications are: Browser, Dolphin Browser another browser option on Android; Bar-code scanner, an application and library for scanning barcodes; Adobe Photoshop, a photo editing software; Fractal, an application for generating fractal images; Poker, an application for calculating winning odds of a popular card game Texas Hold'em; Sudoku Solver, an application for solving the Sudoku game; Checkers, an application that searches possible moves of the checker game for the best move in a fixed time limit (5 seconds); and Chess, an application that searches possible moves of the chess game for the best move in a fixed time limit (60 seconds). The benchmark suites are: Linpack, a benchmark for a system's floating point computing power; and CaffeineMark, a set of microbenchmarks for testing the efficiency of common operations such as method calls and loops. Table 2 shows these applications and the workloads used for measuring their performance. With reference to Table 2, the first eight applications are real applications, and the last two applications are benchmarks.

TABLE 2

Description of the evaluated applications.

| Benchmark | Package Name | Description |
| --- | --- | --- |
| Browser | com.mgeek.android.DolphinBrowser.Browser | web browser loading an HTML web page of size around 1,000 KB |
| Barcode | com.google.zxing.client.androidtest | bar code scanner scanning 40 JPEG images of size around 100 KB |
| Photoshop | com.adobe.psmobile | image editor performing filter effects |
| Fractal | com.softigniter.android.fractal.free.activity | generating a fractal image |
| Poker | com.leslie.cjpokeroddscalculator | calculating Texas Hold'em odds |
| Sudoku | de.georgwiese.sudokusolver | Sudoku solver solving a sample puzzle included in the package |
| Checkers | com.google.android.checkers | checkers game finding the best first move |
| Chess | org.petero.droidfish | chess game finding the best first move |
| Linpack | n/a (runs in console mode) | measures the performance of floating point operations by solving a linear equation |
| CaffeineMark | n/a (runs in console mode) | a set of microbenchmarks testing the efficiency of common operations such as method calls and loops |

For interactive applications, the response time was quantified by measuring the time spent in the longest running event handler that do real work; for pure computation-intensive applications, we measured their overall execution time. For Browser, the time was measured as a page is read in until the event onLoad is dispatched, indicating that the browser has done loading the page. For Barcode scanner, an app, zxingtest, was run to process 40 JPEG images and measured the overall execution time. For Photoshop, its execution time was measured in doRender, a method for doing rendering. For Fractal and Poker, the execution time of run, a method for doing the computations, was measured. For Sudoku Solver, the execution time of onClick was measured. Checkers and Chess display the number of nodes they searched, and these numbers were recorded. All GUI actions were automated with MonkeyRunner scripts.

The applications were run on a Nexus 4, with 1.50 GHz ARMv7 CPU and 2 GB RAM, running Android version 4.2.2 r1 Jelly Bean. The application accelerator's performance was also measured on Nexus S, and similar results to those discussed below were also achieved.

To illustrate improved speed using the application accelerator 103 according to the disclosed subject matter, the performance of the test applications was measured on two configurations:

1. To show that the application accelerator 103 can incrementally improve performance, the performance of the AOT-compiled applications were measured with the original bytecode framework.

2. To show the ultimate speedup, the AOT-compiled applications were run with the AOT-compiled framework. The core and framework libraries were AOT-compiled in the framework.

Table 3 illustrates the improved speed of the evaluated applications, using bytecode applications running with bytecode framework as baseline. For purpose of illustration and confirmation of the disclosed subject matter, Table 3 illustrates performance of various applications with and without the application accelerator. Column "Without fx" shows the measured relative performance of the AOT-compiled applications with the original framework. Column "With fx" shows the measured relative performance of the AOT-compiled applications with the AOT-compiled framework. The larger numbers represent faster performance. As illustrated in Table 3, the application accelerator 103 sped up all real applications evaluated by 18%-79%, and an average of 43%. For example, the application accelerator 103 sped up page loading of the Browser application by 18% and Photoshop by 24%. The application accelerator 103 sped up Linpack by 112.5%, and improved the overall score of Caffeine-Mark by 88.65%. The application accelerator 103 sped up the Logic microbenchmark in CaffeineMark by more than 13 times, at least in part because the application accelerator 103 promotes local variables to registers.

TABLE 3

Speedup of the Applications.

| Benchmark | | Without fx | With fx |
|---|---|---|---|
| Browser | | 1.11 | 1.18 |
| Barcode | | 1.50 | 1.62 |
| Photoshop | | 1.25 | 1.24 |
| Fractal | | 1.39 | 1.54 |
| Poker | | 0.99 | 1.21 |
| Sudoku | | 0.74 | 1.19 |
| Checkers | | 0.61 | 1.66 |
| Chess | | 1.34 | 1.79 |
| Linpack | | 2.12 | 2.12 |
| CaffeineMark | Sieve | 1.26 | 1.26 |
| | Loop | 1.34 | 1.34 |
| | Logic | 13.45 | 13.45 |
| | String | 0.67 | 1.01 |
| | Float | 1.81 | 1.81 |
| | Method | 1.09 | 1.09 |
| | Overall | 1.76 | 1.89 |

The AOT-compiled applications can run smoothly with the bytecode framework as well, showing the application accelerator 103 can be incrementally deployed. Five applications with the bytecode framework (Browser, Poker, Sudoku, Checkers, and String) ran slower or about the same as the corresponding bytecode applications. However, Barcode, Photoshop, Fractal, Chess, and all benchmarks except String showed improved speed, illustrating the benefits of improved speed if application users, brokers, or developers were to adopt the application accelerator 103 before platform providers do.

The application accelerator's energy savings was measured using PowerTutor. For purposes of illustration and confirmation of the disclosed subject matter, Table 4 show exemplary energy saved with and without the disclosed subject matter. As illustrated in Table 4, column "Orig" shows the energy consumption of the original applications; column "AOT" shows that of the AOT-compiled applications with the AOT-compiled framework; column "Percentage" shows the percentage of energy saving. Table 4 shows energy consumption of each real application in Table 4 without and with the application accelerator. Chess and Checkers explore as much space as possible to find the best move in a fixed amount of time, so the application accelerator 103 did not measurably save energy running them as expected. For other applications, the application accelerator 103 significantly reduced energy consumption by 12.71% on average. Compared with Table 3, the energy savings can be correlated with improved speed. That is, the applications with improved speed typically achieve more energy savings.

TABLE 4

Energy saving of the evaluated applications.

| App | Orig (J) | AOT (J) | Percentage |
|---|---|---|---|
| Browser | 54.9 | 53.1 | 3.28% |
| Barcode | 51.2 | 41.9 | 18.16% |
| Photoshop | 17.5 | 15.1 | 13.71% |
| Fractal | 27.5 | 18.9 | 31.27% |
| Poker | 6.1 | 5.5 | 9.84% |
| Sudoku | 1.8 | 1.8 | 0.00% |
| Chess | 70.0 | 70.4 | −0.01% |
| Checkers | 45.8 | 47.4 | −3.49% |

The application accelerator's memory overhead was measured by comparing peak memory usage. For purposes of illustration and confirmation of the disclosed subject matter, Table 5 illustrates exemplary memory consumption of the disclosed subject matter. With reference to Table 5, column "Orig" shows the memory usage of the original app; column "Without fx" shows the memory usage of running the AOT-compiled application with the original framework; column "With fx" shows the memory usage of running the AOT-compiled application with the AOT-compiled framework. Table 5 illustrates the memory usage of the applications with and without the application accelerator's translation. As shown, for certain applications, the application accelerator 103 only AOT-compiled the application but did not AOT-compile the framework, and thus the application accelerator 103 added slight memory overhead. For Chess, the application accelerator 103 reduced the memory usage due at least in part to more optimized machine code. For certain applications, the application accelerator 103 AOT-compiled both the application and the framework, and thus the memory overhead became larger because the entire AOT-compiled framework was loaded at runtime, whereas the JIT compiler only AOT-compiled executed code.

TABLE 5

Memory consumption of the application accelerator.

| App | Orig (KB) | Without fx (KB) | With fx (KB) |
|---|---|---|---|
| Browser | 148,632 | 150,392 | 157,624 |
| Barcode | 39,292 | 39,792 | 41,260 |
| Photoshop | 31,196 | 32,208 | 34,204 |
| Fractal | 42,332 | 42,820 | 44,856 |
| Poker | 38,788 | 39,168 | 40,706 |
| Sudoku | 41,048 | 42,148 | 43,672 |
| Checkers | 63,092 | 63,484 | 65,260 |
| Chess | 56,544 | 45,680 | 48,304 |

As discussed herein, the application accelerator 103 can perform certain techniques such as, but not limited to, optimizations when emitting C code: including but not limited to promoting local variables to registers, making leaf method invocation lightweight, and/or static resolving method invocation.

Table 6 illustrates the effects of these techniques such as optimizations. For purposes of illustration and confirmation of the disclosed subject matter, Table 6 illustrates exemplary effects of the disclosed subject matter. With reference to Table 6, column "No-opt" shows the speedup without any optimization; column "Promotion" shows the speedup with memory promotion; column "Invocation" shows the speedup with both memory promotion and lightweight method invocation. As shown, register promotion significantly sped up Barcode, Fractal, Poker, Checkers, and Chess; the other two optimizations together significantly sped up Checkers and Chess. The effects of the latter two optimizations were not separately measured at least in part because their implementations were coupled

TABLE 6

Effects of techniques such as optimizations.

| App | No-opt | Promotion | Invocation |
|---|---|---|---|
| Browser | 1.13x | 1.18x | 1.18x |
| Barcode | 1.30x | 1.60x | 1.62x |
| Photoshop | 1.24x | 1.25x | 1.24x |
| Fractal | 1.07x | 1.51x | 1.54x |
| Poker | 1.14x | 1.19x | 1.21x |
| Sudoku | 1.14x | 1.18x | 1.19x |
| Checkers | 1.51x | 1.57x | 1.66x |
| Chess | 1.38x | 1.63x | 1.79x |

As discussed herein, the application accelerator 103 can offload compilation to the proxy and can store the AOT-compiled binary on both the proxy and user devices. To quantify the compilation and storage overhead, the compilation time and the size of the AOT-compiled binary was measured.

Table 7 illustrates the compilation time and the size of the AOT-compiled binary of each evaluated application. For purposes of illustration and confirmation of the disclosed subject matter, Table 7 illustrates exemplary compilation and storage overhead of the disclosed subject matter. With reference to Table 7, column "DEX" shows the size of the bytecode, column "Bin" shows the size of the AOT-compiled binary; column "Ratio of binary size to bytecode size" computes the ratio of the binary size to the bytecode size; column "Time" shows the compilation time. For all the applications, the size of the AOT-compiled binary was around three times as large as the size of the bytecode, and the compilation time was less than 30 s. The compilation time was roughly linear to the size of the binary. Considering the proxy can cache the AOT-compiled binary and reuse it for devices of the same type, the measured overhead can be considered reasonable.

TABLE 7

Compilation and storage overhead.

| App | DEX (KB) | Bin (KB) | Ratio of binary size to bytecode size | Time (s) |
|---|---|---|---|---|
| Browser | 3,551 | 11,719 | 3.3x | 117 |
| Barcode | 209 | 713 | 3.4x | 12 |
| Photoshop | 791 | 2,012 | 2.5x | 25 |
| Fractal | 221 | 577 | 2.6x | 8 |
| Poker | 38 | 108 | 2.8x | 2 |
| Sudoku | 167 | 467 | 2.8x | 8 |
| Checkers | 35 | 145 | 4.1x | 4 |
| Chess | 606 | 1,541 | 2.5x | 18 |

The disclosed subject matter can be implemented in hardware or software, or a combination of both. Any of the methods described herein can be performed using software including computer-executable instructions stored on one or more computer-readable media (e.g., communication media, storage media, tangible media, or the like). Furthermore, any intermediate or final results of the disclosed methods can be stored on one or more computer-readable media. Any such software can be executed on a single computer, on a networked computer (for example, via the Internet, a wide-area network, a local-area network, a client-server network, or other such network), a set of computers, a grid, or the like. It should be understood that the disclosed technology is not limited to any specific computer language, program, or computer. For instance, a wide variety of commercially available computer languages, programs, and computers can be used.

The foregoing merely illustrates the principles of the disclosed subject matter Various modifications and alterations to the described embodiments will be apparent to those skilled in the art in view of the teachings herein. It will thus be appreciated that those skilled in the art will be able to devise numerous techniques which, although not explicitly described herein, embody the principles of the disclosed subject matter and are thus within its spirit and scope. Accordingly, other embodiments are within the scope of the claims

We claim:

1. A method for providing an application from an application source to a target device over a network in a native code format used by the target device comprising:
receiving a request for the application including a target device information;
determining whether the application has been cached,
if the application has not been cached:
downloading the application from the application source as a bytecode;
processing, using an Ahead-Of-Time compiler, the bytecode into the native code format, wherein the processing includes,
reviewing each of at least one method of the bytecode, wherein the bytecode includes the at least one instruction;
determining whether the at least one instruction is a leaf method invocation lightweight;
if the at least one instruction is the leaf method invocation lightweight,
determining a callsite of the at least one instruction;
removing stack frame allocation and deallocation of the at least one instruction; and
performing register promotion; and
providing the application in the native code format to the target device over the network.

2. The method of claim 1, wherein the target device information includes one or more of a device type, an operating system version, and a platform version.

3. The method of claim 1, wherein the processing further comprises caching the application in the native code format if the application has not been cached.

4. The method of claim 1, wherein the processing further comprises:
processing the bytecode into an intermediate representation.

5. The method of claim 4, wherein the application in the native code format is invoked by a Virtual Machine.

6. The method of claim 1, wherein the processing further comprises processing a portion of the bytecode into the native code format.

7. The method of claim 1, wherein the bytecode includes at least one of a generic bytecode and a pre-processed bytecode.

8. The method of claim 1, wherein the processing further comprises:
selecting at least one portion of the application; and
processing the bytecode of the at least one portion of the application into the native code format.

9. The method of claim 1, wherein the processing further comprises:
analyzing an instruction of a method of the bytecode, wherein the bytecode includes at least one method and the at least one method includes at least one instruction;
determining if the instruction includes a local variable;
determining a type of the local variable; and
promoting the local variable if the type of a primitive type.

10. The method of claim 1, wherein the processing further comprises statically resolving methods.

11. An apparatus for providing an application from an application source to a target device over a network in a native code format used by the target device, comprising:
a processor; and
a memory to store computer program instruction, the computer program instructions when executed on the processor, cause the processor to perform operations comprising:
receiving a request for the application including a target device information;
determining whether the application has been cached,
if the application has not been cached:
downloading the application from the application source as a bytecode; and
processing, using an Ahead-Of-Time compiler, the bytecode into the native code format, wherein the processing includes,
reviewing each of at least one method of the bytecode, wherein the bytecode includes the at least one instruction;
determining whether the at least one instruction is a leaf method invocation lightweight;
if the at least one instruction is the leaf method invocation lightweight,
determining a callsite of the at least one instruction;
removing stack frame allocation and deallocation of the at least one instruction; and
performing register promotion; and
providing the application in the native code format to the target device over the network.

12. The apparatus of claim 11, wherein the processing is performed by an application developer server.

13. The apparatus of claim 11, wherein the processing is performed by an application broker server.

14. The apparatus of claim 11, wherein the processing is performed by the target device.

15. The apparatus of claim 11, further comprising processing the bytecode into the native code format using an interpreter.

16. The apparatus of claim 15, wherein the interpreter is embedded into the application.

17. The apparatus of claim 15, wherein the interpreter can be at least one of a system interpreter or an embedded interpreter.

18. The apparatus of claim 11, wherein the target device can execute at least one of the bytecode and a native code.

19. A system for providing an application from an application source to a target device over a network in a native code format used by the target device, comprising:
the target device that provides a request for the application;
an application source that provides the application in a bytecode; and
at least one processor that:
receives a request for the application including a target device information;
determines whether the application has been cached,
if the application has not been cached:
downloading the application from the application source as the bytecode; and
processing, using an Ahead-Of-Time compiler, the bytecode into the native code format, wherein the processing includes,
reviewing each of at least one method of the bytecode, wherein the bytecode includes the at least one instruction;
determining whether the at least one instruction is a leaf method invocation lightweight;
if the at least one instruction is the leaf method invocation lightweight,
determining a callsite of the at least one instruction;
removing stack frame allocation and deallocation of the at least one instruction; and
performing register promotion; and
provides the application in the native code format to the target device over the network.

* * * * *